A. A. MANCINI.
NUT LOCK.
APPLICATION FILED NOV. 19, 1920.
1,370,897.
Patented Mar. 8, 1921.
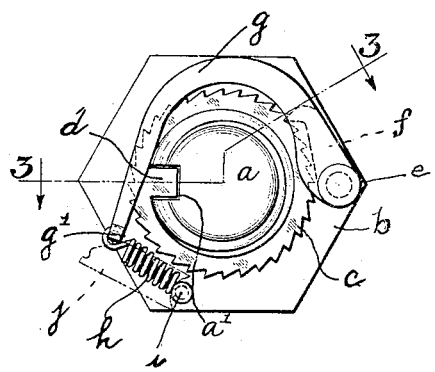
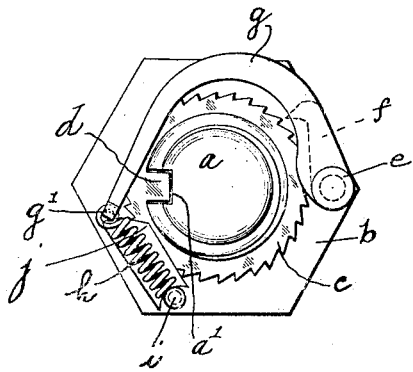
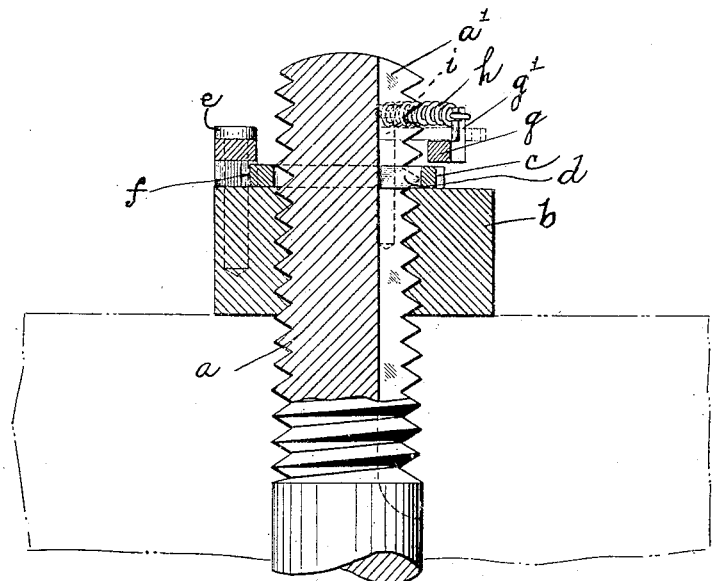

UNITED STATES PATENT OFFICE.

AMEDEO A. MANCINI, OF STAMFORD, CONNECTICUT.

NUT-LOCK.

1,370,897.   Specification of Letters Patent.   Patented Mar. 8, 1921.

Application filed November 19, 1920. Serial No. 425,033.

*To all whom it may concern:*

Be it known that I, AMEDEO A. MANCINI, a subject of the King of Italy, residing at Stamford, in the county of Fairfield and State of Connecticut, have invented certain new and useful Improvements in Nut-Locks, of which the following is a specification, reference being had therein to the accompanying drawings, which form a part thereof.

My invention relates to nut locks, and more particularly to a type thereof wherein the lock mechanism is carried by, and movable with, a nut as it is being tightened, so as to prevent a return movement or loosening of the nut when it is relieved from the action of a wrench thereon, or when subjected to vibrations.

Nut locks of the general type to which my invention relates, are old and well known in this art, my invention relating more particularly to those structural characteristics permitting the nut and its coöperating bolt to be economically produced, and to be used in the same manner as an ordinary nut and its coöperating bolt.

A nut made in accordance with my invention is so constructed that the lock mechanism thereof will function automatically, the coöperating lock members, one of which is carried by and revoluble with the nut and the other of which is slidably mounted upon the coöperating bolt, held against rotation thereby, and adapted to be moved longitudinally thereof with the nut, being so constructed and combined as to prevent displacement of said parts with relation to the nut and to each other. The lock may be readily released to permit a reversal in the direction of rotation of the nut to remove it from the bolt, this release of the locking mechanism requiring no dismemberment of the lock structure.

The invention consists primarily in a nut lock mechanism embodying therein in combination with a screw bolt having a longitudinally extending groove therein, of a nut adapted to coöperate with the screw threads on said bolt, a ratchet wheel adapted to be slidably mounted upon said nut, and having thereon a tongue adapted to enter the groove in said bolt, a pawl pivotally mounted upon said nut adapted to engage said ratchet wheel, an arm carried by said pawl and extending across said ratchet wheel, whereby said ratchet wheel is forced to follow the nut, and means operative to normally engage said pawl with said ratchet wheel while permitting its disengagement therefrom so as to allow the nut to be removed from the bolt, and in such other novel features of construction and combination of parts as are hereinafter set forth and described, and more particularly pointed out in the claims hereto appended.

Referring to the drawings,

Figure 1 is an end view of a bolt and nut embodying my invention, the pawl being shown in the operative relation to the ratchet wheel, and a removable strut being indicated in dotted lines;

Fig. 2 is a similar view with the pawl disengaged from the ratchet wheel; and

Fig. 3 is a view of the end of a bolt with a nut thereon partly in vertical section on the line 3—3 of Fig. 1.

Like letters refer to like parts throughout the several views.

In the embodiment of my invention shown in the drawings, I employ a screw bolt $a$ having a longitudinally extending groove $a'$ adjacent an opening outwardly of, the end thereof, said groove being of sufficient length to adapt the bolt for use with different thicknesses of material.

Aside from the groove $a'$ this screw bolt is of the ordinary construction and may be of any size, pitch or style.

Coöperating with the screw threads upon said bolt $a$ is a nut $b$ also of the usual construction, the contour of this nut being immaterial to the invention, although an ordinary hexagonal nut is shown. Both the bolt $a$ and the nut $b$ are produced by ordinary manufacturing methods, it being merely necessary to mill the groove in the former and mount the lock mechanism on the latter.

Carried by the nut $b$ is a lock mechanism consisting of a sheet metal annular ratchet wheel $c$ having small teeth extending entirely about the perimeter thereof, said ratchet wheel being mounted upon and carried by the nut $b$ and at the same time held against rotation by a tongue $d$ entering the groove $a'$ in the bolt $a$. By this construction said ratchet wheel is permitted to have movement longitudinally of said bolt with the nut $b$ while being held against rotation therewith.

Mounted upon the nut $b$ by means of a pivot $e$ is a pawl $f$ adapted to engage the ratchet wheel $c$ and permit movement of the nut $b$ in one direction while preventing a return movement thereof. The pawl $f$ rides upon the outer face of the nut $b$ and is capable of movement toward and from the ratchet wheel $c$ about the pivot $e$, the axis of which extends parallel with that of the bolt $a$.

Carried by and movable with the pawl $f$ is a curved arm $g$ having the three-fold function of controlling the operative relation of said pawl with the ratchet wheel, imparting longitudinal movement to said ratchet wheel with a rotative movement of the nut $b$, and facilitating the disengagement of the pawl and the ratchet wheel to release the locking mechanism and permit the removal of the nut from the bolt.

The arm $g$ is spaced away from the end of the bolt by the pawl $f$ for a distance slightly greater than the thickness of the ratchet wheel $c$, thus preventing any binding action between said ratchet wheel and the arm as the nut is tightened, while causing the said wheel to move longitudinally of the bolt under the control of the nut and of the arm $g$ bearing on said wheel at substantially diametrically opposite points.

The arm $g$ is provided with an outturned hooked end $g'$ with which the loop at one end of a coiled spring $h$ is connected. The other end of said spring is carried by a stud $i$ spaced away from the end of the arm $g$ sufficiently to properly tension the spring and to permit the insertion of a strut $j$ between said stud and the outturned edge $g'$ in a manner to hold the pawl $f$ out of engagement with the ratchet wheel $c$ and thus permit a reverse rotation of the nut with relation to the bolt and said ratchet wheel.

The use of a strut for disengaging the pawl from the ratchet wheel permits the workman to use both hands in removing the nut and avoids necessity for the use of one hand for releasing the pawl while applying a wrench to the nut, a more or less awkward condition.

The arm $g$ is so shaped that it may be swung outwardly sufficiently to leave clearance for the mounting and removal of the ratchet wheel, the end $g'$ serving as a handhold to facilitate this movement of the arm.

In use, the bolt $a$ is placed in the desired relation and the nut $b$ engaged with the screw-threaded end thereof in the usual manner. If desired the nut, when mounted upon the screw bolt, need not have the ratchet wheel $c$ associated therewith, it being feasible to partially tighten the nut before mounting said ratchet wheel upon the said bolt. Preferably, however, said ratchet wheel may be assembled in the nut before the latter is applied to the bolt, the pawl $f$ having a tendency to force the ratchet wheel into engagement with the stud $i$ so as to hold it in position with the opening in said ratchet wheel in substantial alinement with the opening in the nut. Under the former condition when applying the ratchet wheel to the bolt, the arm $g$ is swung outwardly by hand so as to permit the ratchet to pass between it and the outer face of the nut.

In the latter case, the slight play between the ratchet wheel and the arm $g$, which overhangs same at substantially diametrically opposite points as shown, will permit a partial turning of the bolt in relation to said ratchet wheel so as to automatically engage the tongue $d$ of the latter with the groove $a'$ of the former.

After the tongue $d$ enters said groove, the nut may be turned freely and handled the same as any other nut, the pawl $f$ riding freely over the teeth of the ratchet wheel $c$ and by engagement therewith, preventing a return movement of the nut.

By employing short teeth the nut may be jammed tightly against the body carrying the bolt, there always being enough elasticity in the materials to secure a sufficient binding action even though the pawl $f$ is not in close engagement with the radial face of the ratchet teeth, and a return movement will be so slight that no looseness of parts would be apparent.

The ratchet wheel $c$ has a free sliding fit with the bolt, as well as the tongue $d$ with the groove $a'$.

Whatever the position of the bolt, there will be a tendency of the ratchet wheel $c$ to bind thereon so as to require the movement of said wheel longitudinally of the bolt to be under the control of the arm $g$.

When the nut is once applied to the bolt and tightened, loosening thereof as a result of vibration, is impossible.

If it be desired, however, to remove the nut, it is merely necessary for the workman to engage a strut $j$ with the outturned end $g'$, oscillate the arm $g$, and with it the pawl $f$, sufficiently to disengage the latter from the ratchet wheel $c$ and then bring the other end of the strut in engagement with the stud $i$. When the parts are so positioned, both hands of the workman are free to handle the nut the same as any other nut, the removal of the nut not requiring any dismemberment of the lock mechanism and avoiding any possibility of such a binding of parts as would interfere with the free rotation of the nut.

The various parts entering into the lock mechanism, excepting the pivot $e$ and the stud $i$, may be stamped from sheet metal, the arm $g$ and pawl $f$ being made separately but secured together in any desired manner.

Since the bolt $a$ requires merely one milling operation, and the nut $b$ one drilling operation by a gang drill, it is apparent that the nut lock mechanism may be produced at very low cost in excess of the cost of ordinary screw bolts and nuts, it being possible to use standard articles of the latter type and convert them into a structure having the characteristics of my invention.

In the event of breakage of the spring $h$, it is apparent that the end $g'$ and the stud $i$ may be utilized so as to hold the pawl in engagement with the ratchet wheel by binding ordinary wire about these parts.

It is not my intention to limit the invention to the precise details of construction shown in the drawings, it being apparent that a spring mechanism differing from that shown may be effectively employed, the stud $i$ in that case being utilized merely as an abutment adapted to receive the strut $j$ for holding the pawl disengaged from the ratchet wheel.

Having described the invention, what I claim as new and desire to have protected by Letters Patent, is:—

1. A nut lock mechanism embodying therein in combination with a screw bolt having a longitudinally extending groove therein, of a nut adapted to coöperate with the screw threads on said bolt, a ratchet wheel adapted to be slidably mounted upon said nut, and having thereon a tongue adapted to enter the groove in said bolt, a pawl pivotally mounted upon said nut adapted to engage said ratchet wheel, an arm carried by said pawl and extending across said ratchet wheel, whereby said ratchet wheel is forced to follow the nut, and means operative to normally engage said pawl with said ratchet wheel while permitting its disengagement therefrom so as to allow the nut to be removed from the bolt.

2. A nut lock mechanism embodying therein in combination with a screw bolt having a longitudinally extending groove therein, of a nut adapted to coöperate with the screw threads on said bolt, a ratchet wheel adapted to be slidably mounted upon said nut, and having thereon a tongue adapted to enter the groove in said bolt, a pawl, a pivot having its axis parallel with the axis of the opening in said bolt, whereby said pawl is pivotally mounted upon said nut and adapted to engage said ratchet wheel, a curved arm carried by and movable with said pawl extending about the opening in said bolt and overhanging said ratchet wheel at substantially diametrically opposite points, whereby said ratchet wheel is forced to follow the nut, and means operative to normally engage said pawl with said ratchet wheel while permitting its disengagement therefrom so as to allow the nut to be removed from the bolt.

3. A nut lock mechanism embodying therein in combination with a screw bolt having a longitudinally extending groove therein, of a nut adapted to coöperate with the screw threads on said bolt, a ratchet wheel adapted to be slidably mounted upon said nut, and having thereon a tongue adapted to enter the groove in said bolt, a pawl pivotally mounted upon said nut adapted to engage said ratchet wheel, an arm carried by said pawl and extending across said ratchet wheel, whereby said ratchet wheel is forced to follow the nut, said arm having an outturned end, a stud carried by the nut and spaced away from said outturned end, and a spring engaging said end and said stud, whereby said pawl is caused to normally engage said ratchet wheel, and its disengagement therefrom to allow the nut to be removed from the bolt is permitted through the medium of a strut adapted to operatively engage the end of said arm and said stud.

4. A nut lock mechanism embodying therein in combination with a screw bolt having a longitudinally extending groove therein, of a nut adapted to coöperate with the screw threads on said bolt, a ratchet wheel adapted to be slidably mounted upon said nut, and having thereon a tongue adapted to enter the groove in said bolt, a pawl, a pivot having its axis parallel with the axis of the opening in said bolt, whereby said pawl is pivotally mounted upon said nut and adapted to engage said ratchet wheel, a curved arm carried by and movable with said pawl extending about the opening in said bolt and overhanging said ratchet wheel at substantially diametrically opposite points, whereby said ratchet wheel is forced to follow the nut, said arm having an outturned end, a stud carried by the nut spaced away from said outturned end, and a spring engaging said end and said stud, whereby said pawl is caused to normally engage said ratchet wheel, and is disengagement therefrom to allow the nut to be removed from the bolt is permitted through the medium of a strut adapted to operatively engage the end of said arm and said stud.

In witness whereof I have hereunto affixed my signature, in the presence of two subscribing witnesses, this 18th day of November, 1920.

AMEDEO A. MANCINI.

Witnesses:
F. T. WENTWORTH,
FRIEDA KOEHLER.